United States Patent
Reim

(10) Patent No.: US 10,597,010 B2
(45) Date of Patent: Mar. 24, 2020

(54) METHOD FOR OPERATING A DRIVER ASSISTANCE DEVICE FOR A MOTOR VEHICLE AND CORRESPONDING DRIVER ASSISTANCE DEVICE

(71) Applicant: AUDI AG, Ingolstadt (DE)

(72) Inventor: Nikolaus Reim, Pfaffenhofen (DE)

(73) Assignee: AUDI AG, Ingolstadt (DE)

( * ) Notice: Subject to any disclaimer, the term of this patent is extended or adjusted under 35 U.S.C. 154(b) by 174 days.

(21) Appl. No.: 15/306,653

(22) PCT Filed: Feb. 7, 2015

(86) PCT No.: PCT/EP2015/000263
§ 371 (c)(1),
(2) Date: Dec. 5, 2016

(87) PCT Pub. No.: WO2015/165558
PCT Pub. Date: Nov. 5, 2015

(65) Prior Publication Data
US 2017/0282873 A1 Oct. 5, 2017

(30) Foreign Application Priority Data
Apr. 30, 2014 (DE) .................. 10 2014 006 191

(51) Int. Cl.
*B60K 28/16* (2006.01)
*B60T 8/1769* (2006.01)
*B60T 8/32* (2006.01)

(52) U.S. Cl.
CPC ............ *B60T 8/1769* (2013.01); *B60K 28/16* (2013.01); *B60T 8/322* (2013.01); *B60T 2270/20* (2013.01)

(58) Field of Classification Search
CPC .... B60T 8/1769; B60T 8/322; B60T 2270/20; B60K 28/16
See application file for complete search history.

(56) References Cited

U.S. PATENT DOCUMENTS

| | | | | |
|---|---|---|---|---|
| 4,702,337 A | * | 10/1987 | Burckhardt | B60T 8/1769 180/197 |
| 5,765,929 A | * | 6/1998 | Hirano | B60T 8/175 303/112 |
| 6,422,333 B1 | * | 7/2002 | Kjaer | A01D 34/006 180/197 |

(Continued)

FOREIGN PATENT DOCUMENTS

| | | |
|---|---|---|
| CN | 101372230 A | 2/2009 |
| DE | 101 58 915 A1 | 4/1967 |

(Continued)

OTHER PUBLICATIONS

International Preliminary Report on Patentability dated Nov. 3, 2016 in corresponding Application No. PCT/EP2015/000263; 7 pgs.

(Continued)

*Primary Examiner* — Stephen Holwerda
(74) *Attorney, Agent, or Firm* — Maier & Maier, PLLC

(57) ABSTRACT

A method for operating a driver assistance device for a motor vehicle. A drive potential is respectively determined from all driven wheels of at least one axis of the motor vehicle. The drive potentials are compared and a braking device with a specific wheel braking force is controlled for braking the wheel having a lower drive potential.

4 Claims, 2 Drawing Sheets

(56) References Cited

U.S. PATENT DOCUMENTS

| | | |
|---|---|---|
| 6,663,536 B1 | 12/2003 | Meier |
| 2005/0285442 A1* | 12/2005 | Tsukasaki ............ B60T 8/1769 |
| | | 303/186 |
| 2006/0012245 A1 | 1/2006 | Post, II et al. |
| 2006/0015236 A1* | 1/2006 | Yamaguchi .......... B60K 17/356 |
| | | 701/69 |
| 2006/0211535 A1* | 9/2006 | Casey ................. B60K 17/356 |
| | | 477/3 |
| 2008/0283325 A1 | 11/2008 | Kodama et al. |

FOREIGN PATENT DOCUMENTS

| | | |
|---|---|---|
| DE | 199 50 205 C1 | 11/2000 |
| DE | 199 46 463 C1 | 4/2001 |
| DE | 101 07 455 A1 | 1/2002 |
| DE | 10050421 A1 | 5/2002 |
| DE | 100 50 420 A1 | 3/2003 |
| DE | 10 2004 008 265 A1 | 9/2005 |
| DE | 10 2011 003 490 A1 | 8/2012 |
| EP | 1 093 956 A2 | 4/2001 |
| EP | 1995091 A2 | 11/2008 |

OTHER PUBLICATIONS

German Examination Report dated Feb. 18, 2015 in corresponding Application No. 10 2014 006 191.4; 5 pgs.

International Search Report dated Jun. 15, 2015 in corresponding Application No. PCT/EP2015/000263; 12 pgs.

International Preliminary Report on Patentability dated Jun. 10, 2016 in corresponding Application No. PCT/EP2015/000263; 21 pgs.

Chinese Office Action dated May 2, 2018, in connection with corresponding CN Application No. 201580023681.6 (7 pgs.).

Office Action dated Dec. 26, 2018 in corresponding Chinese Application No. 201580023681.6; 12 pages.

Examination Report dated Sep. 20, 2019, in corresponding European patent application No. 15 703 878.7 including partial machine-generated English language translation; 7 pages.

\* cited by examiner

METHOD FOR OPERATING A DRIVER ASSISTANCE DEVICE FOR A MOTOR VEHICLE AND CORRESPONDING DRIVER ASSISTANCE DEVICE

BACKGROUND

The invention relates to a method for operating a driver assistance device for a vehicle. The invention additionally relates to a corresponding driver assistance device.

The driver assistance device serves to assist the driver of a vehicle, particularly under difficult driving conditions and/or environmental conditions. For example, the driver assistance device is a traction control device or exists as such. Accordingly, the driver assistance device realizes a traction control system in which a braking device is used to brake a wheel of the vehicle that tends to spin or one that is spinning in a targeted manner by applying a certain brake force to the wheel. If this wheel is operatively connected to another wheel via a differential, this braking makes it possible to apply a greater drive torque to the other wheel. However, because the wheel initially spins before the brakes are applied, i.e., there must be slip, disadvantages in terms of the traction may arise despite the described procedure, for example because the wheel that is spinning digs in and/or smooths the ground under the wheel, thus further reducing the existing coefficient of friction between the wheel and the ground.

SUMMARY OF THE DISCLOSURE

It is therefore the object of the invention to propose a method for operating a driver assistance device that does not have the aforementioned disadvantage, but rather improves the traction of the vehicle or of the wheels of the vehicle on the ground, especially in unfavorable environmental conditions.

According to the invention, this is achieved by a method having the features of claim 1. The following steps are provided: measurement of a drive potential of all driven wheels of at least one axle of the vehicle; comparison of the drive potentials; and triggering of a braking device having a certain wheel braking force to brake the wheel having the lower drive potential. The drive potential refers to the force or torque that can be expected to be transferred to the ground via the respective wheel. The greater the drive potential, the more torque can be transferred to the ground, such that a greater traction and/or acceleration of the vehicle is made possible. The drive potential is measured for all driven wheels of the at least one axle of the vehicle. Therefore, there is then a value for the drive potential for each wheel. The determination can generally be carried out in any manner, concrete embodiments being discussed below.

The driven wheels of the axle are preferably operatively connected to one another via a differential, which in this respect can be referred to as an axle differential, and are jointly drivable. The differential can be designed as an unregulated or non-switching differential. The method can of course also be applied to vehicles having multiple axles, for example at least or exactly two axles. Preferably, at least two of the axles, in particular all of the vehicle's axles, are driven such that in this respect there are driven wheels on these at least two axles. The axles of the vehicle are, for example, operatively connected to one another—preferably permanently—via a further differential, which can accordingly be referred to as a central or longitudinal differential. The longitudinal differential can be designed as a regulated or switchable longitudinal differential, in particular as an inter-axle locking differential. If multiple axles are operatively connected to one another in this manner, then each of the axles preferably has its own axle differential.

In a concrete exemplary embodiment, this means that an all-wheel drive vehicle has two axles, namely a front axle and a rear axle. Both the front axle and the rear axle have two wheels that are each coupled to one another or operatively connected to one another via an axle differential. The axle differential of the front axle is coupled or operatively connected to the axle differential of the rear axle via a longitudinal differential. This means that the axle differential of the front axle is connected to a first output shaft of the longitudinal differential and the axle differential of the rear axle is connected to a second output shaft of the longitudinal differential. By contrast, an input shaft of the longitudinal differential is operatively connected to a drive unit of the vehicle by means of which a selectable drive torque can be provided.

The longitudinal differential is preferably designed as a regulated or switchable longitudinal differential, for example as an inter-axle locking differential. The axle differential of the rear axle is also preferably designed as a regulated or switchable axle differential, in particular as an axle locking differential. This may also be the case for the axle differential of the front axle. However, this axle differential is preferably designed as an unregulated or non-switchable axle differential. This is especially true if the longitudinal differential acts asymmetrically, i.e.—provided that all driven wheels have the same drive potential—the drive torque is distributed unevenly to the axle differentials of the front axle and rear axle, the rear axle, for example, being supplied with a greater proportion of the drive torque than the front axle in at least one operating state.

After the drive potential for all driven wheels of the at least one axle of the vehicle (preferably of all axles of the vehicle) has been determined, the wheel having the lower drive potential, in particular the lowest drive potential, is determined. If there are multiple axles having driven wheels, this is preferably done separately for each axle such that the wheel having the lower or lowest drive potential is subsequently known for each axle. This wheel is subsequently braked using the braking device, for which purpose this braking device is triggered accordingly. Of course, provision may also be made to determine the wheel having the lowest drive potential out of all driven wheels of multiple axles, in particular all axles of the vehicle, and to subsequently brake it. The wheel is always braked with the specific wheel braking force. This may be constant or may be determined depending on suitable parameters. For example, the lower the drive potential of the wheel to be braked and/or the greater the difference between the drive potential of the wheel to be braked and the drive potential of at least one other wheel, the greater the wheel braking force selected.

Therefore, in contrast to a conventional traction control system, no provision is made to individually determine whether there is slip for each wheel and—if this is the case or the slip exceeds a defined limit value—to brake the wheel. Rather, multiple wheels are considered as a whole, and the wheel to be braked is to be selected from these wheels. In this respect, the wheels of one or more axles are considered as a whole and not just individual wheels, as is the case for conventional traction control systems. Therefore, there is no waiting—as is usually the case for traction control systems—until wheel slip that is greater than a defined slip limit actually occurs at least at one wheel, and then a drive slip braking force is produced at this wheel. Rather, the wheel is then also to be braked with a defined wheel braking force even if the wheel slip is less than the defined slip limit, such that the occurrence of wheel slip or the exceeding of the slip limit by the wheel slip is already prevented. In this respect, a provision in particular is made for pre-controlling the traction control system using the defined wheel braking force. Preferably, this means that the greater of the braking force of the wheel braking force and drive slip braking force is always applied to the wheel.

A further embodiment of the invention provides that the drive potential is determined from a spring deflection of the respective wheel. The wheel or all wheels of the axle are spring-mounted, said wheels being able to move along a spring travel having a certain length of spring deflection and thus are charged with spring force. In principle, the spring force can be generated using any means, for example, by means of an air suspension system, for which purpose a gas pressure spring is used, for example. However, a conventional metal spring or steel spring can of course also be used to generate the spring force.

The suspension travel that exists between a fully compressed and a fully decompressed wheel position can also be referred to as overall spring deflection. The difference between the current position of the wheel relative to the overall suspension travel starting from the fully compressed position is called spring deflection. It is assumed that a greater spring deflection of the wheel is equivalent to a greater load and, in particular to a greater vertical wheel force. The greater the spring deflection, the greater the drive potential of the respective wheel.

For example, the drive potential is determined from the spring deflection using a mathematical relationship, the drive potential in particular being proportional to the spring deflection. However, other relationships can of course also be used. According to the preceding embodiments, the wheel having less or the least spring deflection is therefore braked, for example. A height sensor is used to determine the spring deflection, for example. For this purpose, such a height sensor is preferably associated with each wheel. In this manner, for example, a wheel is braked that has no contact with the supporting surface of the vehicle and in this respect cannot transfer any torque.

A preferred embodiment of the invention provides that the vertical wheel force associated with each of the wheels is ascertained, and the drive potential of the respective wheel is determined from this vertical wheel force. The vertical wheel force refers in particular to the force that acts between the wheel or a tire of the wheel and the supporting surface of the vehicle. The vertical wheel force thus essentially corresponds to the proportion of the weight of the vehicle that is transferred by the relevant wheel to the ground. This definition applies in particular when the vehicle is at a standstill. The vertical wheel force can, for example, be measured by means of vertical wheel force sensor associated with the relevant wheel and/or be calculated by means of a model. The corresponding drive potential is subsequently determined from the vertical wheel force. For example, the greater the vertical wheel force, the greater the drive potential.

A preferred embodiment of the invention provides that the coefficient of friction between the relevant wheel and the ground, said coefficient of friction being associated with each of the wheels, is determined, and the drive potential of the respective wheel is determined from this coefficient of friction. The coefficient of friction can also be referred to as a friction value or friction coefficient. The coefficient of friction is a measure of the frictional force between the wheel (or the tire of the wheel) and the supporting surface of the vehicle in relation to the contact pressure force, i.e., for example, the vertical wheel force. To determine the coefficient of friction, a friction coefficient sensor and/or a friction coefficient estimator are used, for example It is of course also possible to determine the drive potential from several of the aforementioned variables, i.e. the spring deflection, vertical wheel force and coefficient of friction. Preferably, multiple, i.e. at least two, of the aforementioned variables form the basis of the drive potential. It is particularly preferable that the spring deflection, the vertical wheel force and the coefficient of friction have influence on the drive potential.

A further preferred embodiment of the invention provides that the wheel braking force is determined from the difference between the drive potentials of the wheels. This formulation applies in particular if the axle of the vehicle has exactly two driven wheels. If more than two driven wheels are compared to one another, it may be provided that a mean value of the drive potentials of all wheels is initially calculated and that the difference between the drive potential and the mean value is subsequently calculated for each wheel.

It may now be provided that the braking device used to brake the wheel having the lowest drive potential is triggered, the difference between the drive potential of the wheel and the mean value forming the basis of the defined wheel braking force used. Alternatively, the wheel braking force can also be determined from the difference between the greatest drive potential of all the wheels and the lowest drive potential of all the wheels.

A provision may of course also be made to brake several of the wheels using the braking device. The wheel braking force used in each case is, for example, calculated from the difference between the respective drive potential of the corresponding wheel and the mean value.

A further embodiment of the invention provides that the braking device is only triggered to brake the wheel having the lower braking potential if at least one vehicle state variable query returns a positive result. Therefore, for example, a comparison is made between a vehicle state variable and a limit value. Only if the comparison is positive, i.e. the condition is met, is the wheel having the lower braking potential to be braked using the braking device.

In a further embodiment, it may be provided that the vehicle state variable query checks whether a vehicle speed is lower than a speed limit value and/or whether a vehicle inclination is greater than an inclination limit value and/or whether a steering angle is within a defined steering angle range and/or whether an off-road mode is present. Therefore, the vehicle speed, the vehicle inclination or the steering angle are in particular used as a vehicle state variable. The limit value is represented accordingly by the speed limit value, the inclination limit value or at least one steering angle limit value that limits the steering angle range in at least one direction. It may of course also be provided that multiple, i.e. at least two, of the aforementioned vehicle state variable queries are carried out, and that the wheel shall only be braked using the braking device if all of the vehicle state variable queries employed return positive results.

Thus, for example, the wheel is not to be braked if the vehicle is already achieving a sufficient speed that corresponds to the speed limit value. In addition, or alternatively, the braking is only to be carried out if a specific vehicle inclination has been exceeded, i.e. the vehicle is on a slope, for example. The steering angle can also have an effect on execution of the wheel braking. This braking is thus only to be carried out if, for example, the steering angle is within the steering angle range, which preferably includes an angle that is present when the vehicle drives straight ahead.

Finally, a provision may be made to check whether there is an off-road mode. This off-road mode can, for example, be manually activated or deactivated by a driver of the vehicle. Triggering the braking device to brake the wheel is usually only necessary if the vehicle is on difficult terrain, in which case the off-road mode is preferably activated. In such an embodiment, the braking is therefore only to be done if off-road mode is activated.

A further preferred embodiment of the invention provides that a traction control system triggers the braking device with a drive slip braking force to brake at least one of the wheels if the wheel slip of the wheel exceeds a defined slip limit, the defined wheel braking force being used to pre-control the traction control system. The traction control system is to be provided in addition to the aforementioned procedure for triggering the braking device based on the drive potential. This traction control system is active when the wheel is detected as spinning. In this case, the drive slip braking force is defined in a suitable manner to prevent the wheel from spinning, i.e. to reduce the wheel slip. The drive slip braking force can be selected as constant and/or defined depending on the wheel slip of the relevant wheel.

Preferably, the traction control system only triggers the braking device to brake the wheel once the slip of this wheel exceeds the slip limit. It is provided that the defined wheel braking force is used to pre-control the traction control system. In particular, this means that the braking device is triggered to brake the wheel having an overall braking force that corresponds to the greater braking force of the drive slip braking force and the wheel braking force. Thus, if the drive slip braking force is greater than the wheel braking force, the overall braking force corresponds to the drive slip braking force. Conversely, the overall braking force corresponds to the wheel braking force if the wheel braking force is greater than the drive slip braking force.

Finally, it may be provided that a service brake is used as the braking device. The relevant wheel is mechanically braked using the service brake. Therefore, no provision is made for the wheel to be braked by using an engine brake or the like, for example.

The invention additionally relates to a driver assistance device for a vehicle, in particular for carrying out the method described above. The driver assistance device is characterized in that it is designed to carry out the following steps: determination of a drive potential of all driven wheels of at least one axle of the vehicle; comparison of the drive potentials; and triggering of a braking device having a certain wheel braking force to brake the wheel having the lower drive potential. Reference has already been made to the advantages of such a driver assistance device or such a procedure. The driver assistance device and the corresponding method can be further developed according to the preceding designs, such that reference is made to them in that regard.

The invention of course also relates to a vehicle that is designed to carry out the method described above and/or has the aforementioned driver assistance device.

BRIEF DESCRIPTION OF THE DRAWINGS

The invention is explained in more detail below on the basis of the exemplary embodiments shown in the drawing, without any limitation of the invention. Shown are.

DETAILED DESCRIPTION OF THE DRAWINGS

Figure 1:
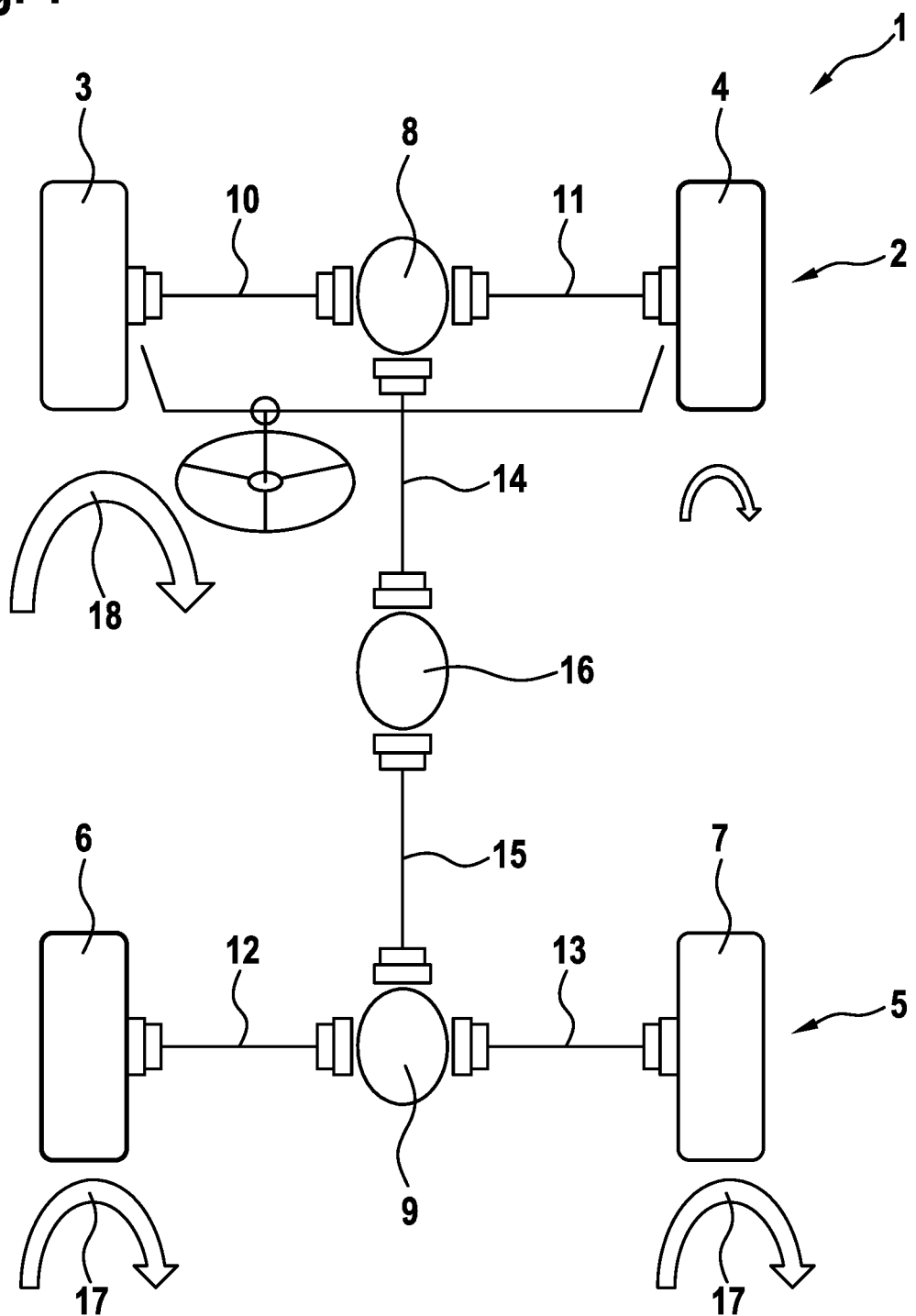
FIG. 1 a schematic depiction of a vehicle having a traction control system.

FIG. 1 shows a schematic depiction of a vehicle 1. This vehicle has a first axle 2, for example a front axle, having wheels 3 and 4. Furthermore, the vehicle 1 has a second axle 5, for example a rear axle, having wheels 6 and 7. The wheels 3 and 4 of the first axle 2 are operatively connected to one another via an axle differential 8. Analogously, the wheels 6 and 7 of the second axle 5 are operatively connected to one another via an axle differential 9. For example, the axle differential 8 has output shafts 10 and 11 and the axle differential 9 has output shafts 12 and 13. Wheel 3 is connected to output shaft 10, wheel 4 is connected to output shaft 1, wheel 6 is connected to output shaft 12 and wheel 7 is connected to output shaft 13, preferably rigidly and/or permanently.

In addition to the output shafts 10, 11, 12 and 13, the axle differentials 8 and 9 have input shafts 14 and 15. These input shafts serve as the output shafts of a center differential 16 or are connected to this. Drive torque from a drive unit can be supplied to the axle differentials 8 and 9 via the center differential 16. For example, the axle differential 9 is a regulated axle differential. Likewise, the center differential 16 can be designed as a controllable center differential. By contrast, the axle differential 8 is preferably an unregulated or non-switchable axle differential.

In this case the vehicle 1 is, for example, positioned on a surface in such a way that the wheels 3 and 7 are only loaded with low vertical wheel force, such that they are decompressed. By contrast, the wheels 4 and 6 are loaded with a higher vertical wheel force such that they are compressed further than the wheels 3 and 7. The vehicle 1 has a traction control system that triggers a braking device (not shown here) to brake at least one of the wheels 3, 4, 6 and 7 if a slip of the wheel 3, 4, 6 or 7 exceeds a defined slip limit. Because the wheels 4 and 6 are more heavily loaded than the wheels 3 and 7, it is desirable for a larger portion of the drive torque to be supplied to the former in order to improve the traction of the vehicle 1.

However, it becomes clear that a certain level of slip (indicated by the arrows 17) must initially occur at the second axle 5, or the wheels 6 and 7, so that the first axle 2 can be supplied with a larger proportion of the drive torque. Furthermore, there must be major slip (indicated by the arrow 18) on the wheel 3 that is more lightly loaded so that the wheel 4 that is more heavily loaded is supplied with a sufficient proportion of the drive torque. In the situation of the vehicle 1 illustrated by FIG. 1, it may be the case that a forward movement of the vehicle 1 can be achieved solely using the traction control system, but only if there is very significant slip at the wheels 3, 6 and 7.

Figure 2:
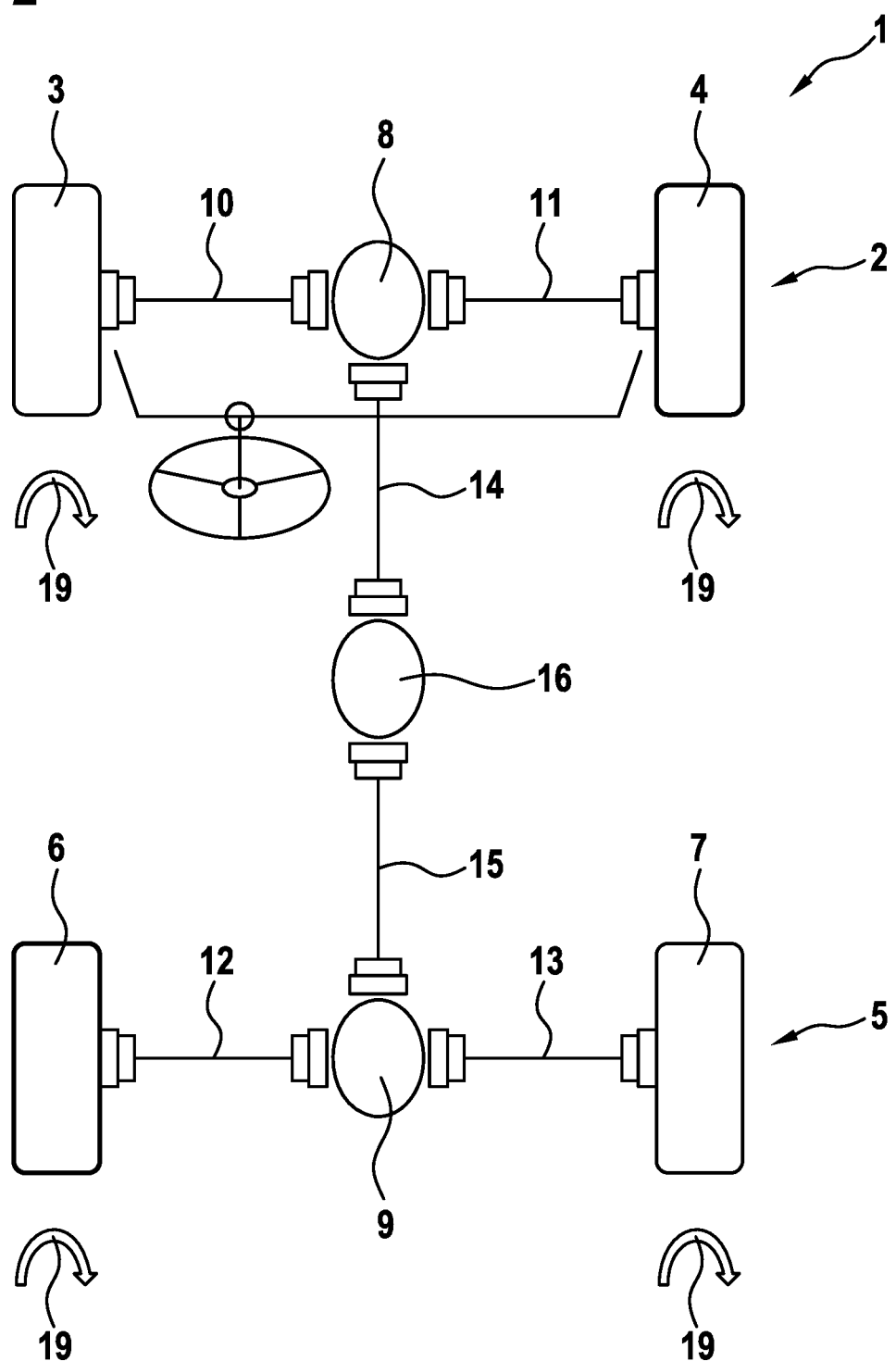
FIG. 2 the already known vehicle having the traction control device, as well as a traction optimization.

FIG. 2 shows the vehicle 1, which is already known, such that reference is made to the preceding in this respect. Here it is now provided that a drive potential of all driven wheels 3 and 4 of the first axle 2 is initially determined by means of a driver assistance device (not shown in detail). These determined drive potentials are compared to one another, after which the braking device is triggered using a defined wheel braking force to brake the wheel 3 or 4 having the lower drive potential.

This means that the wheel 3 that is more lightly loaded is already braked before there is actually any slip. This allows for comparatively lower slip (indicated by the arrow 19) to be achieved for all four wheels 3, 4, 6 and 7, the drive torque acting on the supporting surface of the vehicle 1 being identical to the case outlined above on the basis of FIG. 1. Therefore, the disadvantages associated with a large slip of the wheels 3, 4, 6 and 7 (for example the wheels 3, 4, 6 and 7 digging in, the ground being smoothed and stability disadvantages) which can arise due to instability in the second axle 5 (caused by the large slip), for example, are avoided.

The invention claimed is:

1. A method for operating a driver assistance device for a vehicle, comprising:
   determining a drive potential of two driven wheels of at least one first axle of the vehicle, wherein the two driven wheels of the first axle are operatively connected to one another via a first axle differential, and two driven wheels of at least one second axle of the vehicle wherein the two driven wheels of the second axle are operatively connected to one another via a second axle differential, wherein the first axle and the second axle are operatively connected via a center differential;
   comparing the drive potentials of each respective wheel; and
   triggering a braking device having a wheel braking force to brake the wheel having a lower drive potential,
   wherein the drive potential is defined from a spring deflection of each respective wheel, or from ascertaining a vertical wheel force associated with each of the wheels and determining the drive potential of the respective wheel from the vertical wheel force;
   wherein the braking device is only triggered to brake the wheel having the lower drive potential if at least one vehicle state variable query returns a positive result;
   wherein the vehicle state variable query checks at least one of: whether a vehicle speed is lower than a speed limit value, whether a vehicle inclination is greater than an inclination limit value, whether a steering angle is within a defined steering angle range, and whether there is an off-road mode, and
   wherein a service brake is used as the braking device.

2. The method according to claim 1, wherein the wheel braking force is determined from a difference between the drive potentials of the wheels.

3. The method according to claim 1, wherein a traction control system triggers the braking device using a drive slip braking force to brake at least one of the wheels if a wheel slip of the wheel exceeds a defined slip limit, the defined wheel braking force being used to pre-control the traction control system.

4. A driver assistance device for a vehicle, comprising:
   means for ascertaining a drive potential of two driven wheels of at least one first axle of the vehicle, wherein the two driven wheels of the first axle are operatively connected to one another via a first axle differential, and two driven wheels of at least one second axle of the vehicle wherein the two driven wheels of the second axle are operatively connected to one another via a second axle differential, wherein the first axle and the second axle are operatively connected via a center differential;
   means for comparing the drive potentials; and
   means for triggering a braking device having a wheel braking force to brake the wheel having a lower drive potential,
   wherein the drive potential is defined from a spring deflection of each respective wheel, from ascertaining a vertical wheel force associated with each of the wheels and determining the drive potential of the respective wheel from the vertical wheel force;
   wherein the braking device is only triggered to brake the wheel having the lower drive potential if at least one vehicle state variable query returns a positive result;
   wherein the vehicle state variable query checks at least one of: whether a vehicle speed is lower than a speed limit value, whether a vehicle inclination is greater than an inclination limit value, whether a steering angle is within a defined steering angle range, and whether there is an off-road mode, and
   wherein a service brake is used as the braking device.

* * * * *